(12) United States Patent
Barnes et al.

(10) Patent No.: US 10,970,410 B2
(45) Date of Patent: Apr. 6, 2021

(54) ACCESSING PROTECTED DATA BY A HIGH-PERFORMANCE COMPUTING CLUSTER

(71) Applicant: Lawrence Livermore National Security, LLC, Livermore, CA (US)

(72) Inventors: Peter Barnes, Oakland, CA (US); Daniel Fedor-Thurman, Livermore, CA (US); Kyle D. Halliday, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 128 days.

(21) Appl. No.: 15/795,040

(22) Filed: Oct. 26, 2017

(65) Prior Publication Data

US 2019/0130122 A1 May 2, 2019

(51) Int. Cl.
*G06F 21/62* (2013.01)
*G06F 21/60* (2013.01)
(Continued)

(52) U.S. Cl.
CPC ...... *G06F 21/6218* (2013.01); *G06F 12/1408* (2013.01); *G06F 21/602* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 2005/0251567 A1* | 11/2005 | Ballew | G06F 9/5077 709/223 |
| 2006/0075278 A1* | 4/2006 | Kallahalla | G06F 3/0683 714/4.1 |

(Continued)

OTHER PUBLICATIONS

Introduction to Code Signing. [online]. Microsoft. Aug. 14, 2017, [retrieved on Jun. 11, 2019]. Retrieved from the internet: URL: https://docs.microsoft.com/en-us/previous-versions/windows/internet-explorer/ie-developer/platform-apis/ms537361(v=vs.85) (Year: 2017).*

(Continued)

*Primary Examiner* — Taghi T Arani
*Assistant Examiner* — Joshua Raymond White
(74) *Attorney, Agent, or Firm* — Perkins Coie LLP (57) ABSTRACT

A data protection system is provided that allows applications to access protected data in a way that restricts applications from outputting to unauthorized targets any unprotected data derived from the protected data and that ensures that the applications do not have access to a key that allows access to the unprotected data. The data protection system provides a policy server that may execute on a service node of a high performance computing system and a data encryption process that may execute on each compute node that is allocated to an application or batch job. The policy server maintains policies of entities specifying access control for protected data. The data encryption process generates a secure execution environment for an application process and interfaces with the policy server to retrieve keys for decrypting protected data in accordance with a policy, and it decrypts and provides the decrypted data to the application process.

36 Claims, 7 Drawing Sheets

(51) Int. Cl.
*G06F 12/14* (2006.01)
*G06F 21/53* (2013.01)

(56) References Cited

U.S. PATENT DOCUMENTS

| | | | | |
|---|---|---|---|---|
| 2007/0168292 | A1* | 7/2007 | Jogand-Coulomb | G06F 21/6218 705/52 |
| 2007/0233837 | A1* | 10/2007 | Imai | H04L 67/025 709/223 |
| 2008/0022136 | A1* | 1/2008 | Mattsson | H04L 67/1006 713/194 |
| 2008/0170693 | A1* | 7/2008 | Spies | G06F 21/6245 380/277 |
| 2012/0310983 | A1* | 12/2012 | Mittal | G06F 21/6209 707/785 |
| 2013/0219176 | A1* | 8/2013 | Akella | H04L 63/0815 713/165 |
| 2014/0059642 | A1* | 2/2014 | Deasy | H04L 63/20 726/1 |
| 2016/0088011 | A1* | 3/2016 | Johri | H04L 63/101 726/23 |
| 2017/0171246 | A1* | 6/2017 | Arumugam | H04L 63/08 |
| 2017/0256018 | A1* | 9/2017 | Gandhi | G06T 1/60 |

OTHER PUBLICATIONS

Hands on—Docker Networking and Namespaces. [online]. Matt Conran. Mar. 19, 2016, [retrieved on Jun. 11, 2019]. Retrieved from the internet: URL: https://network-insight.net/2016/03/hands-on-docker-networking-and-namespaces/ (Year: 2016).*

Hands on—Docker Networking and Nameplaces. [online]. Matt Conran. Mar. 19, 2016, [retrieved on Jun. 11, 2019]. Retrieved from the internet: URL: https://network-insight.net/2016/03/hands-on-docker-networking-and-namespaces/ (Year: 2016).*

How to Easily Put a Windows PC into Kiosk Mode With Assigned Access, [online]. Chriss Hoffman, How-to-Geek, Jul. 12, 2017, [retrieved on Jun. 11, 2019]. Retrieved from the Internet: URL: https://www.howtogeek.com/173562/how-to-easily-put-a-windows-pc-into-kiosk-mode-with-assigned-access/ (Year: 2017).*

Introduction to Code Signing. [online]. Microsoft. Aug. 14, 2017, [retrieved one Jun. 11, 2019], Retrieved from the internet: URL: https://docs.microsoft.com/en-us/previous-versions/windows/internet-explorer/ie-developer/platform-apis/ms537361(v=vs.85) (Year: 2017).*

The Secure Sockets Layer (SSL) Protocol Version 3.0. [online] A. Freier, Internet Engineering Task Force, Aug. 2011. [retrieved on May 1, 2020]. Retrieved from the internet: URL: https://tools.ietf.org/html/rfc6101 (Year: 2011).*

Shamir, Aid, "How to Share a Secret", Communications of the ACM, 22 (11): 612-613, Nov. 1979, 2 pages.

* cited by examiner

ACCESSING PROTECTED DATA BY A HIGH-PERFORMANCE COMPUTING CLUSTER

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

High-performance data center may have tens of thousands of nodes connected via a communications channel. The nodes may be organized into high-performance computing ("HPC") systems, also referred to as clusters, that are identified by a cluster or machine name. Each node may include one or more processors (e.g., an AMD Opteron processor), memory (e.g., between 1-8 gigabytes), and a communications interface to connect the nodes to the communications channel. The communications channel may have routing tables specifying how to route incoming packets from a source node to a destination node. The nodes of an HPC system may be designated as service nodes or compute nodes. Compute nodes are primarily used to perform computations and may not have any persistent file storage. A service node may provide operating system and programming environment services (e.g., file system services, external I/O, compilation, editing, etc.) to application programs executing on the compute nodes and to users logged in to the service nodes. The service nodes may include file servers, a batch system, I/O services, and so on. Since compute nodes may not have local file storage, the compute node may interface via the communications channel with a file server service node for persistent file storage.

A batch system may be responsible for managing the execution of batch programs ("jobs") by the compute nodes of a cluster. A batch job may be used to perform complex computational tasks, such as sophisticated simulations and/or data analyses, and may operate on very large datasets with millions or billions of records. To effectively support such computational tasks, a batch job may need to execute in parallel on a set of compute nodes that may include hundreds or even thousands of compute nodes assigned from the cluster. To submit a batch job for execution, a user may sign on to the batch system and submit a batch job request that identifies one or more job scripts that specify the executable code that is to execute and that identify parameters for execution of the batch job, such as the number of compute nodes to be allocated to the batch job, the expected execution time and maximum execution time of the batch job, priority of the batch job, and so on. The batch system queues the submitted batch jobs and then schedules execution of the batch jobs based on various factors such as availability of compute nodes, priorities of the batch jobs, expected execution time, and so on. To launch a batch job, the batch system allocates a set of the specified number of computer nodes and distributes the job scripts to components of the batch system that execute on the compute nodes. The component at a compute node reads the job script and launches execution of the executable code specified by the job script. The batch system may also terminate a batch job for various reasons, such as the execution time having exceeded the maximum execution time. In a large HPC system, many unrelated batch jobs may be executing simultaneously on separate portions of the cluster, but the batch system may allow each compute node to execute only one batch job at a time. For example, in an HPC system with 3000 compute nodes, a set of 1000 compute nodes may be allocated to one batch job, and a set of 2000 different compute nodes may be allocated to another batch job.

Because an HPC system may execute many different types of batch jobs for different entities (e.g., organizations and users), the HPC system needs to ensure that data of one entity cannot be accessed by another entity. When a batch job executes, it typically executes with the access control permissions associated with the user who submitted the job request. For example, if a user has read/write access to certain data stored at a file server, then a batch job submitted by that user would also have read/write access to that data. Many data application domains have special data handling requirements such as stringent access control, protection, logging, and auditing for sensitive data. For example, the Health Insurance Portability and Accountability Act ("HIPAA") of the United States requires special data handling of the protected health information ("PHI") of patients. As another example, organizations may require special data handling of their proprietary data. Some special data handling requirements may be that data is to be encrypted when at rest (e.g., stored on disk or tape) and when in transit (e.g., while being transferred over a communications channel). Other special handling requirements may be that wherever data is decrypted or encrypted, memory needs to be wiped and caches emptied upon completion and the encryption/decryption keys need to be securely managed.

Typical encryption/decryption techniques for protecting data result in two possible protection states for protected data for each user: (1) the data is encrypted and not usable by the user or (2) the data is decrypted and completely usable by the user. Access to the decryption keys is controlled by authenticating a user via a password known to the user or via a certificate issued to the user. When a user gains access to the decryption key for data, the user can decrypt the protected data and do virtually anything the user wants with the protected data, including sending a copy of the decrypted data to an unauthorized user. If the sending of decrypted data is somehow prevented by the access control mechanism, the user may still be able to send a copy of the encrypted data to the unauthorized user and provide the decryption key to the unauthorized user (e.g., via handing over a handwritten paper with the key).

These encryption/decryption techniques have several problems. First, if the user is authenticated, then the user is completely trusted and can do virtually anything with the decrypted data. Second, since the user is not typically connected when a batch job is executed, the user cannot provide their password. Thus, the batch job needs access to the user's certificate, which presents a security vulnerability. Third, the techniques typically provide no mechanism to prevent a batch job from sending to unauthorized users the decryption keys that the batch job needs to decrypt data or even the decrypted data itself. Fourth, the techniques do not provide a full audit trail of which batch jobs or executable code accessed which protected data. Fifth, the techniques do not provide a record of the provenance of output data (e.g., which executable code run by which user operated on which input data to generate that output data).

DETAILED DESCRIPTION

Methods and systems are provided that allow applications to access protected data (e.g., encrypted data) in a way that restricts the applications from outputting to unauthorized targets (e.g., other compute nodes, I/O devices, communication channels or systems) unprotected data derived from the protected data (e.g., sending decrypted data to an unauthorized compute node) and that ensures that the applications do not have access to a key (e.g., decryption key) that allows access to the unprotected data. In some embodiments, a data protection system provides a policy server that may execute on a service node of an HPC system and a data encryption process that may execute on each compute node that is allocated to an application or batch job. The policy server maintains policies of entities specifying access control for protected data, which is encrypted data stored by the HPC system or is otherwise accessible by the HPC system (e.g., via the Internet). A policy may specify the encrypted data to which the policy applies, the users and executable code that are allowed access to an unencrypted version of the encrypted data, the type of access (e.g., read/write) that is permitted, and so on. The policy server also has access to keys for decrypting and encrypting data, such as a symmetric encryption key or a public/private key pair. The data encryption process executes at a compute node allocated by a batch system to a batch job along with an application process that executes executable code (also referred to as the "executable") of a batch job. The data encryption process establishes an execution environment for the application process that may restrict output of data by the application process to only compute nodes that are allocated to the same batch job. The data encryption process also interfaces with the policy server to ensure that, when the application process requests to access encrypted data, it is authorized to do so. If the application process is authorized to do so, the data encryption process retrieves the key for the encrypted data from the policy server, retrieves the encrypted data (e.g., stored on a file server of the HPC system), decrypts the encrypted data using the key, and provides the decrypted data to the application process.

The data encryption system thus overcomes several problems of typical encryption/decryption techniques. For example, an application process can read decrypted data (e.g., for its analytical processing) but can be prevented from outputting the decrypted data or data derived from the decrypted data or limited to outputting such data to compute nodes allocated to the same batch job or a secure file server. Also, the data encryption system need not have a user password or user certificate to gain access to encrypted data. As another example, since the key needed to decrypt data is not provided to the application process, the application process cannot provide the key to an unauthorized entity or any other entity. The data protection system can provide a full audit trail of the batch jobs, executable code, and users that access encrypted data via logging by the data encryption processes and/or the policy server. This audit trail allows the provenance of data output by an application process to be determined. In addition, the owner of a policy can change that policy (e.g., revoke access rights to encrypted data) at any time without having to re-encrypt data with a new encryption key because the application processes are not provided with the encryption key.

In some embodiments, the data protection system provides an application with access to decrypted versions of encrypted data based on policies stored by a policy server. The policy server maintains the policies of owning entities that specify the access control for encrypted data of the owning entities. For example, a health organization may have a database of medical records of millions of patients that are required by law to be stored in an encrypted form. An entity may create a policy that includes a policy name and a path to a file, a directory, a database server, or similar that contains the encrypted data and specifies whether the access control is read-only, write-only, or read-write. The policy includes the identification of users allowed to access the encrypted data. The policy includes paths to executables that are authorized to access the decrypted version of the encrypted data along with a hash of each executable. The policy also specifies a decryption key and/or an encryption key for the encrypted data. For example, a policy may contain a key or may identify a key server that stores the key. The key may be referred to as an object encryption key ("OEK"). If the policy contains the key, the key may be encrypted using a policy object key ("POK") associated with the policy and stored by the policy server. A policy server may encrypt each policy with a policy server key to help ensure the security and/or confidentiality of each policy. When a policy contains a key that is encrypted with a policy object key, only the encrypted version of the key will be available when the policy is decrypted with the policy key so that the policy can be accessed without compromising the object encryption key. The following is an example policy:

```
"policyName": "project-a-policy",
"description": "Policy governing raw data for Project A",
"createdBy": "Jane Doe",
"keyOwnership": {
    "keyOwners": [{
        "name": "John Doe",
        "keyServerURL": "https://localhost:8200",
        "keyServerType": "vault"
    }]
},
"allow": [{
    "usernames": ["user-a "],
    "executables": [{
        "path": "/usr/bin/cat",
        "hashMd5": "1484a27859e2ca20ad667cc06d595d22"
    }, {
        "path": "/usr/bin/cp",
        "hashMd5": "afc7c3ab2546d6d8a98854dcaaa731b3"
    }, {
        "path": "/usr/bin/xpdf",
        "hashMd5": "16cae1178d6d25b86e26c14a9e766d54"
    }],
    "readPathPolicies": [{
```

```
        "basePath": "projects/project-a"
    }],
    "writePathPolicies": [{
        "basePath": "projects/project-a"
    }]
  }]
}
```

This example is in the JavaScript Object Notation ("JSON") with attribute/value pairs. The policy name is "project-a-policy." The key is owned by "John Doe" and is stored at a key server with a uniform resource locator ("URL") of "https://localhost:8200." The key server may store the key in association with the identifier of the encrypted data, which is identified by the attribute "basePath" as "projects/project-a." The "allow" attribute specifies users and executables that are allowed read or write access to the specified encrypted data. The encrypted data whose access is to be controlled via the data protection system may be registered with the policy server. For example, the path to the file or to the directory that contains the file may be registered, the owner whose files are all encrypted may be registered, and so on. Also, rather than registering files that contain the encrypted data, a file may have metadata that specifies it is encrypted data. For example, the file may be stored in the Trusted Data Format ("TDF").

In some embodiments, when a batch job is to execute on a compute node to access encrypted data, a data encryption process is launched at the compute node prior to running the job script for the batch job (or as part of a modified job script that inserts the launching of the data encryption process). The data encryption process is provided the identification of the executable of the batch job and the policy specified for the batch job. The data encryption process establishes a secure communications channel with the policy server of the HPC system. For example, the data encryption process and the policy server may exchange certificates and encrypt their communications using the public key of the other or may establish a session key that is a symmetric key. The data encryption process may also request the policy server to verify that the executable of the job script is registered as an executable specified by the policy by sending an identifier of the policy and a hash of the executable to the policy server. If the executable is not registered, the data encryption process may then abort. If it is registered, the data encryption process establishes a secure execution environment for the application process that is to execute the executable code of the batch job. The data encryption process creates an application process for execution of the executable. The secure environment restricts output by the application process to ensure that decrypted data is not inadvertently or intentionally stored on an unauthorized file server, sent to an unauthorized compute node, or otherwise provided to an unauthorized entity. The data encryption process may change the apparent root directory for the application process so that the application process cannot access any resources outside of that root directory. For example, the data encryption process may perform a "chroot" operation of a UNIX operating system to establish a "chroot jail" for the application process. As part of the process, the data encryption process may cause the routing tables to be updated so that the application process can communicate only with other compute nodes of the same batch job. The data encryption process may also dynamically establish or modify the secure execution environment during execution of the application process based on changing security needs. For example, access to a certain server may be prohibited before an application process is allowed to access a particularly sensitive encrypted file or portion of a file. The secure execution environment may also be specified by the security policy so that the secure execution environment can be defined on a policy-by-policy basis rather than having the same secure execution environment for all application processes.

The data encryption process may allow additional trusted services to be accessed as specified by the security policy when it is later retrieved from the policy server. The data encryption process also establishes a mechanism by which the application process can request access to encrypted data, read data decrypted by the data encryption process, or write data to be encrypted by the data encryption process. For example, the data encryption process may create a virtual file system for the application process, allocate shared memory, open a shared channel using sockets, linked library to intercept system calls, and so on. A virtual file system may be created using Filesystem in UserSpacE ("FUSE") technology. The linked library may include functions corresponding to system calls to pass control to the data encryption process so that the data encryption process can invoke the actual system calls prior to decrypting data and after encrypting data. The functions of the linked library may be dynamically linked into the address space of the application process during execution. After the execution environment is established for the application process, the data encryption process launches execution of the executable of the batch job within the application process with a user identifier specified in the job script. For example, the data encryption process may perform a fork operation and then an execute operation of the UNIX operating system to launch the executable.

The application process then accesses files, for example, using normal system calls to the virtual file system. The data encryption process responds to these calls by performing encryption/decryption as needed to access encrypted data. If a system call is to access a data file that is not protected, the data encryption process translates the call to a normal file system call. The data encryption process may determine whether the file is encrypted data based on its registration with the policy server or its metadata. When the application process opens an encrypted file, the data encryption process generates a protected data request that identifies the policy specified by the job script, the user, the executable, the encrypted file, the access type, and the certificate of the data encryption process. The data encryption process then sends the protected data request to the policy server.

Upon receiving a protected data request, the policy server retrieves the identified policy and decrypts the policy using its policy key. The policy server then determines whether the policy allows the requested access to the encrypted file by the combination of the executable and the user. If the requested access is not allowed, the policy server notifies the data encryption process that the request is not allowed. If it is allowed, the policy server retrieves the object encryption key for the encrypted data and decrypts it with its policy object key. The policy server then re-encrypts the object encryption key with the encryption key (e.g., public key) of the data encryption process and sends the re-encrypted object encryption key to the data encryption process. In some embodiments, the policy server may send the policy to the data encryption process so that the data encryption process can enforce the policy by checking whether the request and subsequent requests are allowed without having to communicate with the policy server for each read or write request.

Upon receiving the re-encrypted object encryption key, the data encryption process decrypts the object encryption key and stores it for decrypting the encrypted data of the encrypted file. If the application process subsequently reads from the encrypted file, the data encryption process retrieves an encrypted portion of the encrypted file, decrypts the portion with the object encryption key, and provides the decrypted portion to the application process. If the application process subsequently writes to the encrypted file, the data encryption process encrypts the data with the object encryption key and writes the encrypted data to the encrypted file. In some embodiments, to provide a more secure environment, the data protection system may require that the data encryption process check the policy for every access request. In this way, if a batch job is long-running, its access to an encrypted file can be revoked or modified while it is running without having to encrypt the file with a different key. If the data encryption process stores a copy of the policy, the policy server may send an update to each data encryption process of a batch job whenever the policy of the batch job changes.

In some embodiments, the policy server of an HPC system may be a federated policy server that maintains some policies locally and accesses other policy servers that maintain their own policies. For example, an organization may implement its own policy server to manage and enforce the policies of the organization. The organization may register the name of its policies with the policy server of the HPC system with an indication to redirect enforcement of the policies to the policy server of the organization. When the policy server of the HPC system receives a protected data request, it forwards the request to the policy server of the organization and any response to the data encryption process.

In some embodiments, the data protection system may allow a policy to have multiple owners whose approvals are needed before granting a request to access an encrypted file covered by the policy. For example, two organizations may collaborate to generate data that is to be protected so that its use requires approval of both organizations. The protected data may be encrypted using Shamir's Secret Sharing ("SSS"). With SSS, the key used to encrypt a file is divided into multiple parts, sometimes referred to as "shards." The key can be generated from the parts (e.g., from a specified number of two or more parts). Each organization is provided with its own part. The organizations may then generate a policy covering the protected data that requires the policy server of the HPC system to forward any request to access the protected data to the policy servers of the organizations. The policy server of each organization checks the request against its policy. If the request is allowed, the policy server sends its part (e.g., encrypted with the key of the policy server of the HPC system) to the policy server of the HPC system. Upon receiving the parts, the policy server generates the object encryption key for the encrypted file and provides it to the data encryption process. If sufficient policy servers do not provide their parts, then the policy server of the HPC system cannot generate the object encryption key to the encrypted file and the data encryption process cannot decrypt the file, and thus the application process cannot access the decrypted file.

In some embodiments, the policy servers generate a log of all requests from data encryption processes, requests redirected to other policy servers and their responses, and decisions whether to grant a request. If a policy server processes a key generated from multiple parts, that policy server informs the policy servers that each provided a part as to whether the request was granted so that those policy servers can locally log the status of the request. A data encryption process also generates a log of all its requests and responses. If a data encryption process enforces a policy locally (e.g., after that policy is downloaded from the policy server of the HPC system), the data encryption process notifies the policy server of the HPC system of each request and whether the request was granted. The logging by the data encryption processes and the policy servers helps ensure that the audit and provenance requirements of the organization can be satisfied.

Although the data protection system is described as being implemented primarily in the context of an HPC system, the data protection system may be implemented in a cloud-based system. A cloud data center may provide tens of thousands of computers (e.g., servers) that can be allocated to various customers for running applications of the customers. A cloud data center may provide a data storage service for storing the data of its customers in a way that provides backup services in a geographically redundant matter. A cloud data center may provide a policy server to service multiple customers, or each customer may provide their own policy server. When an application is to execute, the cloud data center would allocate computers for the application. In some embodiments, depending on the security and confidentiality requirements of the application, the cloud data center may allocate virtual machines, rather than physical computers for the application. In such a case, the allocated virtual machine may execute on a computer simultaneously with a virtual machine of another application. Alternatively, the cloud data center may allocate virtual machines and dedicated computers to an application to allow only virtual machines of the application to executed on the allocated computers.

In some embodiments, the data protection system may allow a job to interface with a policy server and/or database server (i.e., storing encrypted files) that is not within the same cluster as the job or that is not even within the same data center. In such a case, each data encryption process of job would establish a secure connection with the policy server and/or database server. The data encryption process and the policy server could exchange public keys to ensure secure communications. In addition, the nodes allocated to a job could themselves be allocated from different clusters or even different HPC data centers. The nodes would communicate with each other using secure communications channels.

A batch job may be considered to be part of an overall application system that includes various applications for performing functions of the overall application system. The applications may be implemented as source code in a high-level language, which may be compiled into machine code or byte code or may be in an interpreted language. The term "executable" refers to the form of the application that controls the operation of a node during execution such as machine code, byte code, source code of an interpreted language, and so on. An application thus comprises source code and corresponding executable code.

Figure 1:
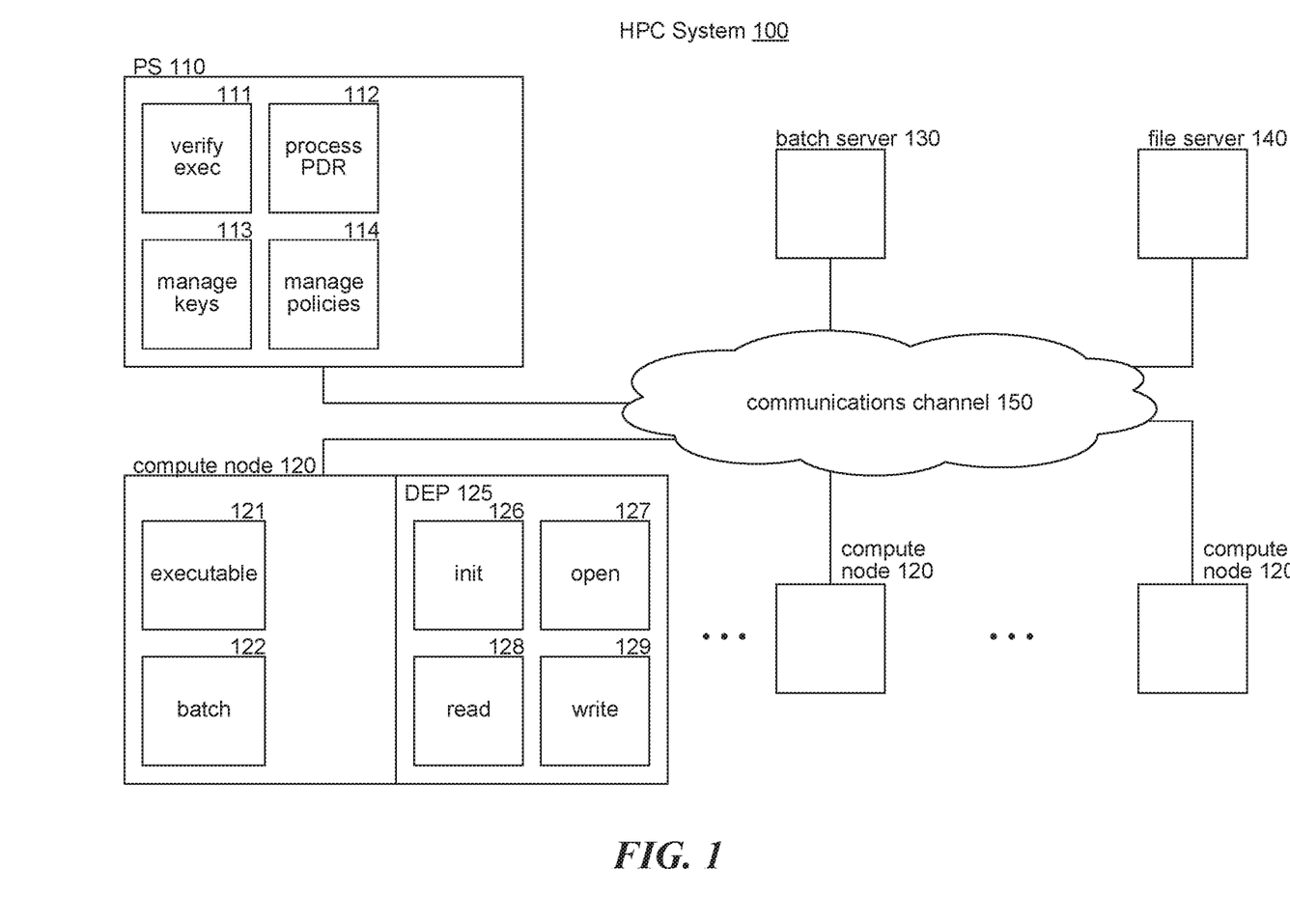
FIG. 1 is a block diagram illustrating components of a data protection system in some embodiments.

FIG. 1 is a block diagram illustrating components of a data protection system in some embodiments. A data protection system executes within an HPC system 100 that includes a policy server 110, compute nodes 120, a batch server 130, and a file server 140 that are connected via a communications channel 150. The policy server includes a verify executable component 111, a process protected data request ("PDR") component 112, a manage keys component 113, and a manage policies component 114. The verify executable component is invoked when the policy server receives a request to verify that an executable is authorized under a policy. The process PDR component is invoked when a protected data request is received from a data encryption process executing at a compute node allocated to a batch job. The manage keys component provides functionality for storing object encryption keys for encrypting and decrypting files and policy keys for decrypting and encrypting policies. The manage policies component provides functionality for storing and retrieving policies submitted by various entities using the HPC system. Each compute node may include an executable 121, a batch component 122, and a data encryption process 125. The executable is the executable code of a batch job that is to execute on a compute node. The batch component is part of the batch system that includes the batch server that is responsible for allocating resources for and scheduling batch jobs submitted to the batch server. The batch component receives job scripts from the batch server and coordinates the running of the job scripts at a compute node. The data encryption process includes an initialize component 126, an open component 127, a read component 128, and a write component 129. The initialize component is invoked to create a secure execution environment for an application process that is to execute the executable. The open component is invoked when the application process requests to open an encrypted file, for example, by invoking a system call of the virtual file system. The open component interacts with the policy server to ensure that the executable is allowed to access the encrypted file and to retrieve the object encryption key for the encrypted file. The read component is invoked when the application process requests to read encrypted data of an open file. The read component retrieves encrypted data and decrypts the encrypted data using the object encryption key. The write component is invoked when the application process requests to write encrypted data to an open file. The write component encrypts the data to be written using the object encryption key and stores the encrypted data in the encrypted file. The file server may store encrypted files and unencrypted files that are accessible by the compute nodes. The communications channel provides routing of communications between the nodes of the HPC system.

The computing devices and systems on which the data protection system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the data protection system. The data transmission media is used for transmitting data via transitory, propagating signals or carrier waves (e.g., electromagnetism) via a wired or wireless connection.

The data protection system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 2:
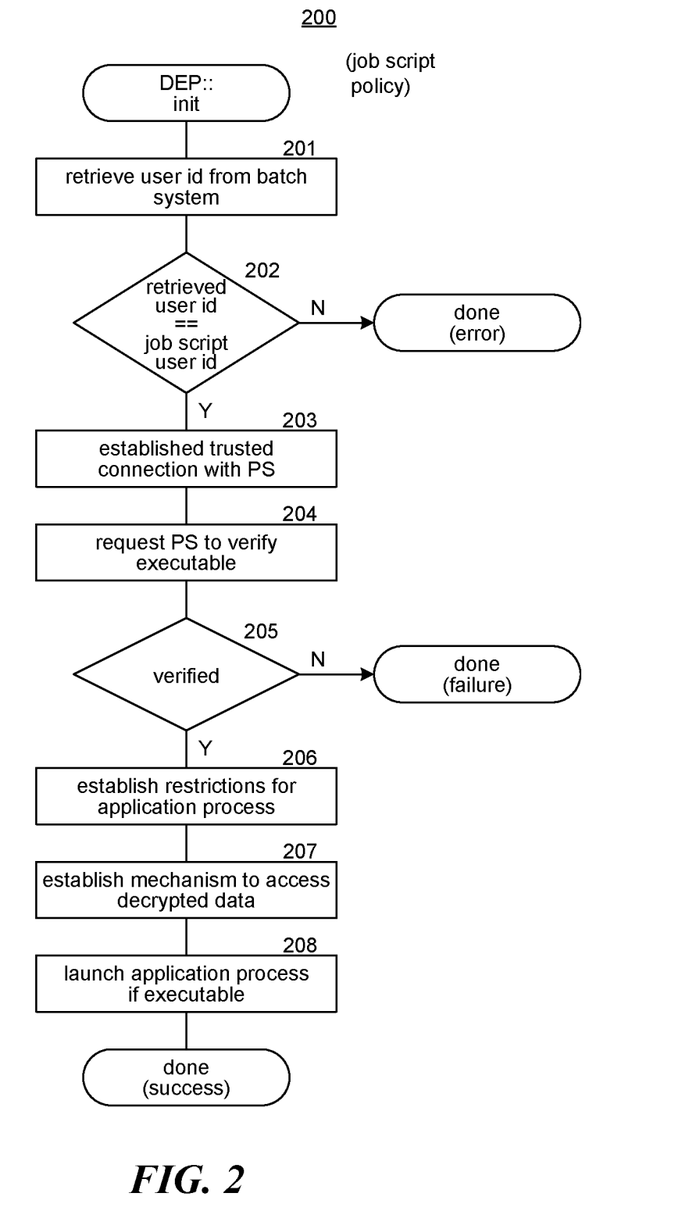
FIG. 2 is a flow diagram that illustrates processing of an initialize component of a data encryption process in some embodiments.

FIG. 2 is a flow diagram that illustrates processing of an initialize component of a data encryption process in some embodiments. An initialize component 200 is invoked to initialize an application process for executing an executable of a batch job. The component may be passed an indication of a job script and an applicable policy. In block 201, the component retrieves from the batch system the user identifier for the user running the batch job. In decision block 202, if the retrieved user identifier matches the user identifier of the job script, then that user is authorized to run the batch job and the component continues at block 203, else the component completes with an error. In block 203, the component establishes a trusted connection with the policy server. For example, the component may exchange certificates with the policy server and use the public key of the certificates to encrypt communications. In block 204, the component requests the policy server to verify the executable by sending a hash of the executable with an indication of the policy to the policy server. For example, the component may direct that a hash of the executable be generated and provide that hash to the policy server. The hash may be generated by a secure feature of the hardware processor of the compute node such as Intel's Trusted Platform Module of Intel's Trusted Execution Technology. The component receives an indication from the policy server as to whether the hash matches that of an executable of the policy. In decision block 205, if the executable is verified, then the component continues at block 206, else the component completes, indicating a failure. In block 206, the component establishes a secure execution environment by placing restrictions on the application process such as limiting communications to compute nodes allocated to the same batch job. In block 207, the component establishes a mechanism for the application process to access the decrypted data (e.g., a virtual file system). In block 208, the component launches the executable to execute within the application process and then completes.

Figure 3:
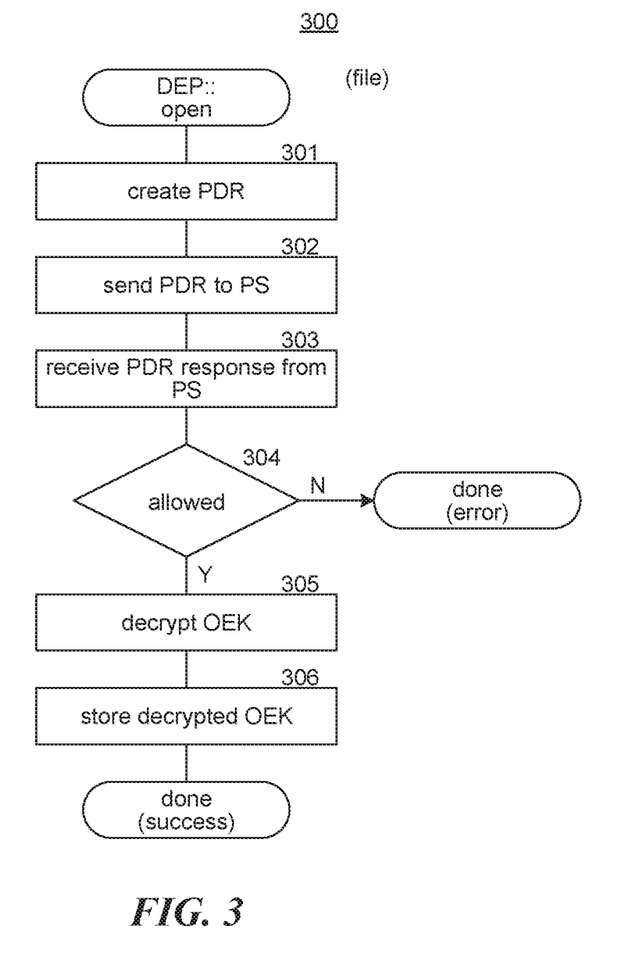
FIG. 3 is a block diagram that illustrates the processing of an open component of a data encryption process in some embodiments.

FIG. 3 is a block diagram that illustrates the processing of an open component of a data encryption process in some embodiments. An open component 300 is invoked when an application process requests to open an encrypted file. In block 301, the component generates a protected data request that identifies the policy, the file, the executable, the user, and the type of access being requested. In block 302, the component sends the protected data request to the policy server. In block 303, the component receives a response to the protected data request from the policy server. In decision block 304, if the request is allowed, then the component continues at block 305, else the component completes with an error. In block 305, the component decrypts the object encryption key provided in the response with a key of the data encryption process such as the private key corresponding to the public key of the certificate of the data encryption process. In block 306, the component stores the decrypted object encryption key and then completes with an indicator of success.

Figure 4:
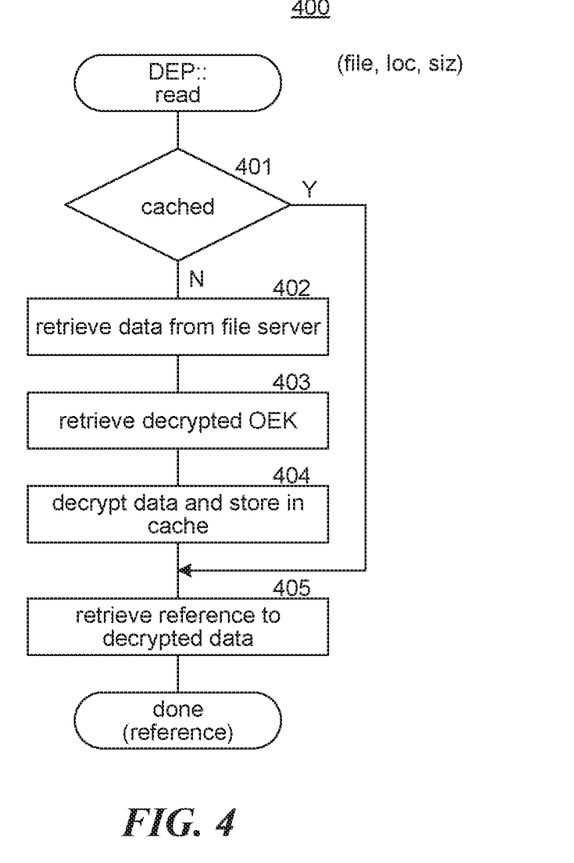
FIG. 4 is a flow diagram that illustrates the processing of a read component of a data encryption process in some embodiments.

FIG. 4 is a flow diagram that illustrates the processing of a read component of a data encryption process in some embodiments. A read component 400 is invoked passing an indication of the file, a location within the file, and the size of the read request. In decision block 401, if the decrypted data corresponding to the read request has been cached locally by the data encryption process, then the component continues at block 405, else the component continues at 402. In block 402, the component retrieves the data to be read from the file server. In block 403, the component retrieves the object encryption key for the file. In block 404, the component decrypts the data using the object encryption key and stores it in the cache. In block 405, the component retrieves a reference to the decrypted data that is stored in the cache and completes, returning the reference to the application process.

Figure 5:
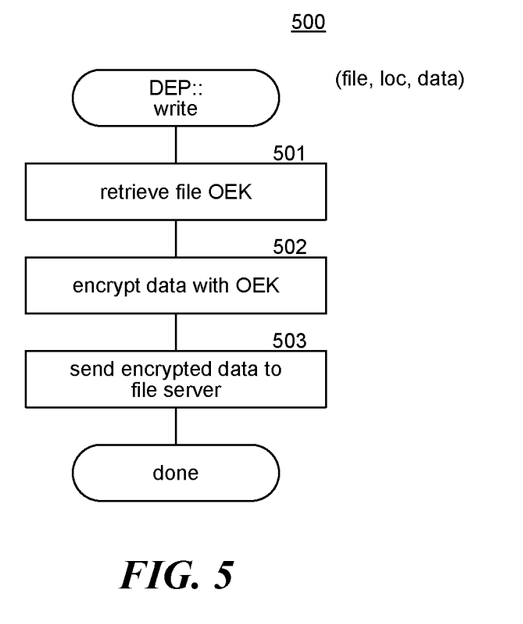
FIG. 5 is a flow diagram that illustrates the processing of a write component of a data encryption process in some embodiments.

FIG. 5 is a flow diagram that illustrates the processing of a write component of a data encryption process in some embodiments. A write component 500 is passed an indication of the file, a location within the file, and data to be written to the file and stores the encrypted data in the file. In block 501, the component retrieves the object encryption key for the file. In block 502, the component encrypts the data with the object encryption key. The component may also cache the unencrypted data for read requests. In block 503, the component sends the encrypted data for storage at the file server and then completes.

Figure 6:
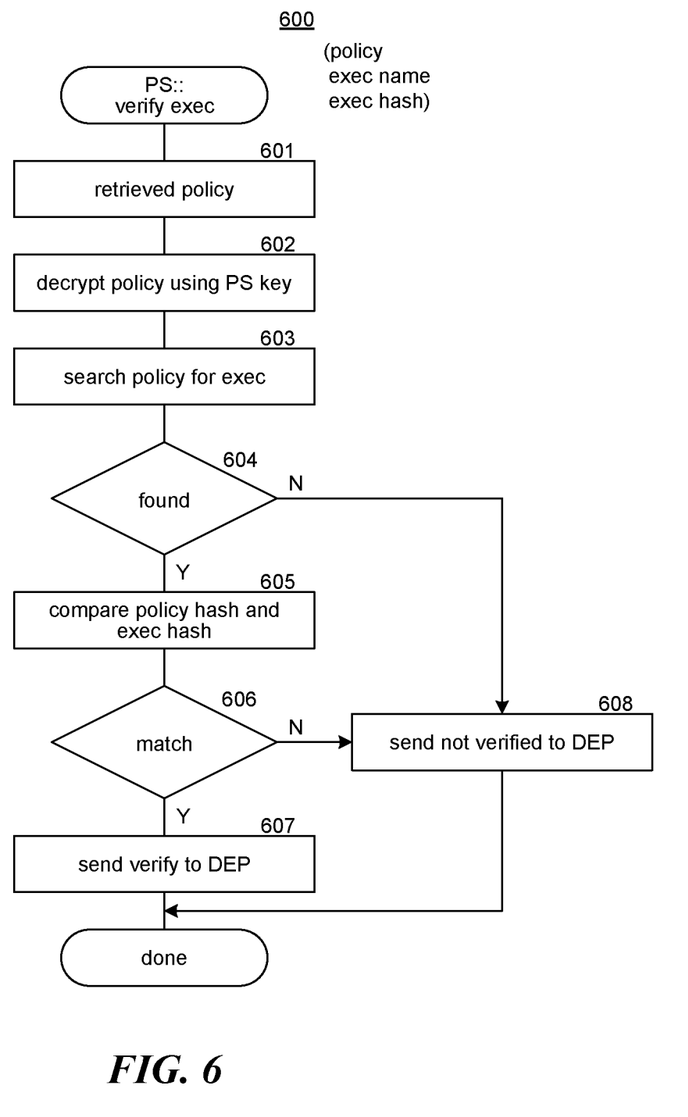
FIG. 6 is a flow diagram that illustrates the processing of a verify executable component of a policy server in some embodiments.

FIG. 6 is a flow diagram that illustrates the processing of a verify executable component of a policy server in some embodiments. A verify executable component 600 is invoked with an indication of a policy, an executable, and a hash of the executable provided by a data encryption process. The component interacts with the policy server to verify that the executable is authorized to access the encrypted data of the policy. In block 601, the component retrieves the policy. In block 602, the component decrypts the policy with the policy server key. In block 603, the component searches the policy for the name of the executable. In decision block 604, if the executable is found in the policy, then the component continues at block 605, else the component continues at block 608. In block 605, the component compares the hash in the policy to the hash provided by the data encryption process. In decision block 606, if the hashes match, then the component continues at block 607, else the component continues at block 608. In block 607, the component sends a verified response to the data encryption process and completes. In block 608, the component sends a not verified response to the data encryption process and then completes.

Figure 7:
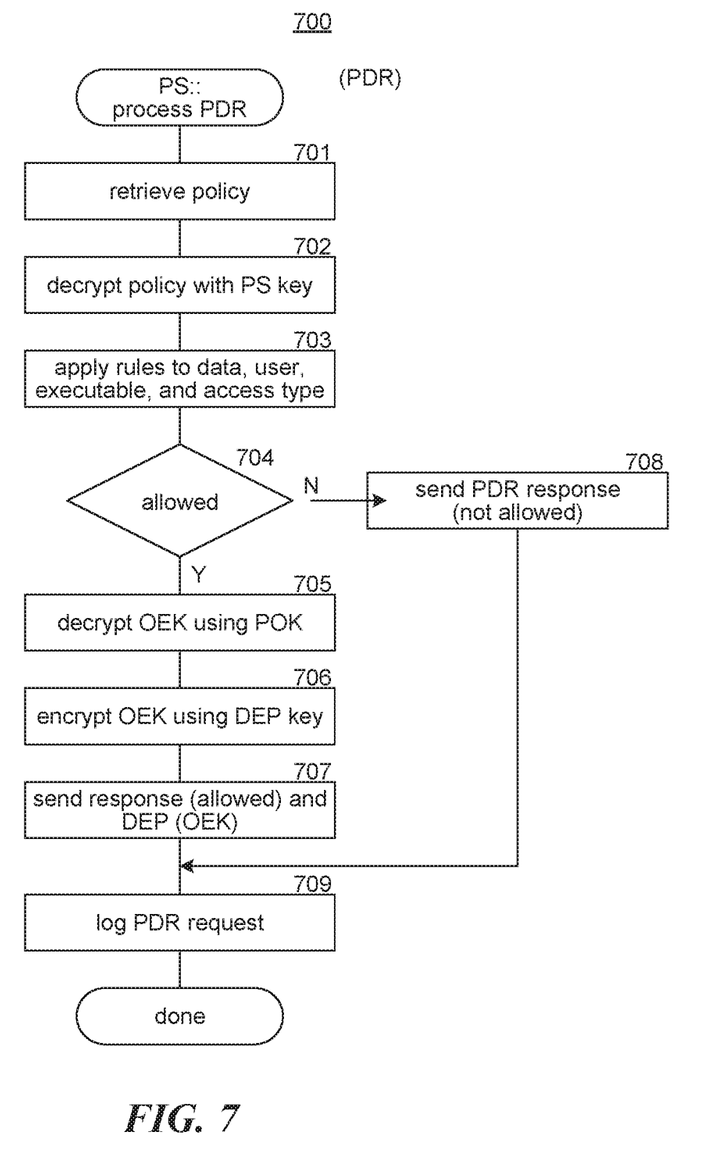
FIG. 7 is a block diagram that illustrates processing of a process protected data request component of a policy server in some embodiments.

FIG. 7 is a block diagram that illustrates processing of a process protected data request component of a policy server in some embodiments. A process protected data request component 700 is invoked to process a request to access encrypted data provided by a data encryption process. In block 701, the component retrieves a policy identified in the protected data request. In block 702, the component decrypts the policy using the policy key of the policy server. In block 703, the component checks the policy to determine whether the executable and user of the protected data request are authorized to access the data for the requested access type. In decision block 704, if the access is allowed, then the component continues at block 705, else the component continues at block 708. In block 705, the component decrypts the object encryption key for the encrypted data using a policy object key of the policy server. In block 706, the component encrypts the object encryption key with the key of the data encryption process. In block 707, the component sends to the data encryption process a response indicating that the protected data request is allowed along with the encrypted object encryption key. In block 708, the component sends to the data encryption process a response indicating that the protected data request is not allowed. In block 709, the component logs the protected data request and completes.

The following paragraphs describe various embodiments of aspects of the data protection system. An implementation of the data protection system may employ any combination of the embodiments. The processing described below may be performed by a computing device with a processor that executes computer-executable instructions stored on a computer-readable storage medium that implements the data protection system.

In some embodiments, a method performed by a computing device for providing an application with access to a decrypted version of an encrypted file is provided. The method launches a data encryption process. Under control of the data encryption process, the method launches an executable of the application as an application process in a secure execution environment that restricts output by the application process. Upon receiving from the application process a request to read from the encrypted file, the method sends to a policy server a key request for an object encryption key for the encrypted file. The request identifies a policy for the application, a user, the executable, and the encrypted file. The method receives from the policy server an encrypted object encryption key for the encrypted file. The method decrypts he object encryption key. The method retrieves at least a portion of the encrypted file. The method decrypts the retrieved portion using the object encryption key. The method stores the decrypted portion so that the decrypted portion is accessible by the application process. The application process is not provided with the object encryption key and cannot output data except in accordance with the secure execution environment. In some embodiments, the application is part of a batch job that executes on compute nodes of a computing system. In some embodiments, the method further, under control of the data encryption process, verifies that the executable is registered with the policy server prior to launching the executable. In some embodiments, the method further, under control of the data encryption process, establishes output restrictions for the application process prior to launching the executable. In some embodiments, the method further, under control of the data encryption process, establishes a secure communications channel with the policy server. In some embodiments, the key request includes a certificate of the data encryption process so that the policy server can authenticate the data encryption process. In some embodiments, the storing of the decrypted portion allows the application process to access the decrypted portion via a virtual file system established by the data encryption process. In some embodiments, the storing of the decrypted portion allows the application process to access the decrypted portion via memory that is shared between the application process and the data encryption process. In some embodiments, the request from the application process to read from the encrypted file is received via a function of a linked library for intercepting system calls by the application process and passing control to the data encryption process.

In some embodiments, the method further, under control of the data encryption process and upon receiving from the application process a request to write data to the encrypted file, encrypts the data using the object encryption key and stores the encrypted data in the encrypted file.

In some embodiments, a computing device for providing an application with access to a decrypted portion of encrypted data without providing to the application an object encryption key for decrypting the encrypted data is provided. The computing device comprises one or more computer-readable storage mediums storing computer-executable instructions to execute within a data encryption process of the computing device and one or more processors for executing the computer-executable instructions stored in the one or more computer-readable storage mediums. The computer-executable instructions for controlling the computing device to launch an application process for the application such that output of the decrypted portion by the application process is restricted; send to a policy server a key request for the object encryption key for the encrypted data, the request identifying a policy for the application, a user, an executable of the application, and the encrypted data; receive from the policy server the object encryption key; retrieve a portion of the encrypted data; decrypt the retrieved portion using the object encryption key; and store the decrypted portion so that the decrypted portion is accessible by the application process. In some embodiments, the computing device is a compute node and the application is part of a batch job that executes on a cluster of compute nodes of a computing system. In some embodiments, output of the decrypted portion is restricted to compute nodes of the batch job. In some embodiments, no other application executes on the computing device while the application executes. In some embodiments, the key request includes a certificate of the data encryption process so that the policy server can authenticate the data encryption process. In some embodiments, the instructions that store the decrypted portion allow the application process to access the decrypted portion via a virtual file system established by the data encryption process. In some embodiments, the instructions that store the decrypted portion allow the application process to access the decrypted portion via memory that is shared between the application process and the data encryption process. In some embodiments, data encryption process receives a request from the application process to read the encrypted data via a function of a linked library for intercepting system calls by the application process and passing control to the data encryption process.

In some embodiments, a method performed by a computing device for providing policy services to compute nodes within a computing system of nodes is provided. The method stores policies for defining access control to encrypted data and identifying an object encryption key for the encrypted data. Each policy identifies encrypted data and one or more applications authorized to access a decrypted version of the encrypted data. The method establishes a secure communications channel with a data encryption process of a compute node of the computing system. The method receives from the data encryption process via the secure communications channel a key request for the object encryption key for the encrypted data. The key request identifies the encrypted data and an application that is requesting access to a decrypted version of the encrypted data. When a policy indicates that the application is authorized to access a decrypted version of the encrypted data, the method sends the object encryption key to the data encryption process via the secure communications channel. In some embodiments, a policy identifies a file storing encrypted data and identifies applications that are authorized to access a decrypted version of the encrypted data of the identified file. In some embodiments, a policy identifies a file storing encrypted data and identifies users that are authorized to access a decrypted version of the encrypted data of the identified file. In some embodiments, the key request identifies a policy. In some embodiments, the key request identifies a user under whose permission the application is to execute and a hash of executable code of the application. In some embodiments, the method further ensures that the policy specifies that the user is authorized to access a decrypted version of the encrypted data and that the hash matches the hash of an executable that is authorized to access the decrypted version of the encrypted data. In some embodiments, the method further receives from the data encryption process a request to verify that executable code of the application is registered.

In some embodiments, one or more computer-readable mediums storing computer-executable instructions of a data protection system is provided. The instructions comprise instructions of a data encryption component and a policy server. The data encryption component executes as a data encryption process on a compute node of a computing system. The data encryption process launches an application process for an application that requests to access encrypted data. The data encryption process retrieves from a policy server an object encryption key for the encrypted data when the request satisfies a policy for accessing the encrypted data. The data encryption process retrieves the encrypted data The data encryption process decrypts a portion of the encrypted data with the object encryption key to generate a decrypted portion. The data encryption process also provides the decrypted portion to the application process without providing the object encryption key to the application process. The policy server component executes as a policy server on a node of the computing system. The policy server stores policies that specify access control polices for accessing encrypted data and provides to a data encryption process an object encryption key for the encrypted data when a request from that data encryption process satisfies a policy for accessing the encrypted data. In some embodiments, an application is allocated compute nodes of the computing system and wherein a data encryption process and an application process execute on each allocated compute node. In some embodiments, the policy server for the computing system provides policy services to multiple applications that each execute simultaneously on a cluster of compute nodes. In some embodiments, the data encryption process restricts locations to which an application process outputs the decrypted portion. In some embodiments, the data encryption process directs routing tables of a communications channel of the computing system to restrict output of the decrypted portion. In some embodiments, an application process is restricted to outputting the decrypted portion only to other compute nodes that are executing the same application. In some embodiments, the policy server coordinates with other policy servers to provide policy services. In some embodiments, the policy server stores registrations of executable code of applications and provides to a data encryption process a verification that executable code of an application is authorized to use the data protection system.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device for providing an application with access to a decrypted version of an encrypted file, the method comprising:
    launching a data encryption process for execution on the computing device;
    under control of the data encryption process,
        initiating by the data encryption process launching of an executable of the application for execution on the computing device as an application process in a secure execution environment, the secure execution environment restricting the application process to resources within the secure execution environment;
        upon receiving from the application process a request to read from the encrypted file,
            sending to a policy server a key request for an object encryption key for the encrypted file, the request identifying a policy for the application, a user, the executable, and the encrypted file;
            receiving from the policy server an encrypted object encryption key for the encrypted file, the encrypted object encryption key being sent by the policy server in response to receiving the key request;
            decrypting the object encryption key;
            retrieving at least a portion of the encrypted file;
            decrypting the retrieved portion using the object encryption key; and
            storing the decrypted portion in the secure execution environment so that the decrypted portion is accessible by the application process, and the application process cannot output the decrypted portion to any resources outside the secure execution environment,
    wherein the application process is not provided with the object encryption key and cannot output data except in accordance with the secure execution environment.

2. The method of claim 1 wherein the application is part of a batch job that executes on compute nodes of a computing system.

3. The method of claim 1 further comprising, under control of the data encryption process, verifying that the executable is registered with the policy server prior to launching the executable.

4. The method of claim 1 further comprising, under control of the data encryption process, establishing output restrictions for the application process prior to launching the executable.

5. The method of claim 1 further comprising, under control of the data encryption process, establishing a secure communications channel with the policy server.

6. The method of claim 1 wherein the key request includes a certificate of the data encryption process so that the policy server can authenticate the data encryption process.

7. The method of claim 1 wherein the storing of the decrypted portion allows the application process to access the decrypted portion via a virtual file system established by the data encryption process.

8. The method of claim 1 wherein the storing of the decrypted portion allows the application process to access the decrypted portion via memory that is shared between the application process and the data encryption process.

9. The method of claim 1 wherein the request from the application process to read from the encrypted file is received via a function of a linked library for intercepting system calls by the application process and passing control to the data encryption process.

10. The method of claim 1 further comprising, under control of the data encryption process and upon receiving from the application process a request to write data to the encrypted file,
    encrypting the data using the object encryption key; and
    storing the encrypted data in the encrypted file.

11. A computing device for providing an application with access to a decrypted portion of encrypted data without providing to the application an object encryption key for decrypting the encrypted data, the computing device comprising:
    one or more computer-readable storage mediums storing computer-executable instructions for execution within a data encryption process of the computing device, the computer-executable instructions for controlling the computing device to, under control of the data encryption process:
    initiate by the data encryption process launching of an application process for the application for execution on the computing device in a secure execution environment that controls access by the application process to resources outside the secure execution environment;
    send to a policy server a key request for the object encryption key for the encrypted data, the request identifying a policy for the application, a user, an executable of the application, and the encrypted data;
    receive from the policy server the object encryption key;
    retrieve a portion of the encrypted data;
    decrypt the retrieved portion using the object encryption key; and
    store the decrypted portion in the secure execution environment so that the decrypted portion is accessible by the application process;
    wherein the application process cannot output the decrypted portion to any resource outside the secure execution environment; and
    one or more processors for executing the computer-executable instructions stored in the one or more computer-readable storage mediums.

12. The computing device of claim 11 wherein the computing device is a compute node and the application is part of a batch job that executes on a cluster of compute nodes of a computing system.

13. The computing device of claim 12 wherein output of the decrypted portion is restricted to compute nodes of the batch job.

14. The computing device of claim 11 wherein no other application executes on the computing device while the application executes.

15. The computing device of claim 11 wherein the key request includes a certificate of the data encryption process so that the policy server can authenticate the data encryption process.

16. The computing device of claim 11 wherein the instructions that store the decrypted portion allow the application process to access the decrypted portion via a virtual file system established by the data encryption process.

17. The computing device of claim 11 wherein the instructions that store the decrypted portion allow the application process to access the decrypted portion via memory that is shared between the application process and the data encryption process.

18. The computing system of claim 11 wherein data encryption process receives a request from the application process to read the encrypted data via a function of a linked library for intercepting system calls by the application process and passing control to the data encryption process.

19. A method performed by a computing device for providing policy services to compute nodes within a computing system of nodes, the method comprising:
storing policies for defining access control to encrypted data and identifying an object encryption key for the encrypted data, each policy identifying encrypted data and one or more applications authorized to access a decrypted version of the encrypted data;
establishing a secure communications channel with a data encryption process executing on a compute node of the computing system, and the compute node of the computing system further includes an application process whose launch is initiated launched by the data encryption process and executing on the compute node of the computing system, the application process launched within a secure execution environment that limits access by the application process to resources outside the secure execution environment and prevents the application process from outputting a decrypted portion to a resource outside the secure execution environment;
receiving from the data encryption process via the secure communications channel a key request for the object encryption key for the encrypted data, the key request identifying the encrypted data and the application process that is requesting access to a decrypted version of the encrypted data; and
when a policy indicates that the application process is authorized to access a decrypted version of the encrypted data, sending the object encryption key to the data encryption process via the secure communications channel, so that the application process within the secure execution environment cannot read the objection encryption key.

20. The method of claim 19 wherein a policy identifies a file storing encrypted data and identifies applications that are authorized to access a decrypted version of the encrypted data of the identified file.

21. The method of claim 19 wherein a policy identifies a file storing encrypted data and identifies users that are authorized to access a decrypted version of the encrypted data of the identified file.

22. The method of claim 19 wherein the key request identifies a policy.

23. The method of claim 22 wherein the key request identifies a user under whose permission the application is to execute and a hash of executable code of the application.

24. The method of claim 23 further comprising ensuring that the policy specifies that the user is authorized to access a decrypted version of the encrypted data and that the hash matches the hash of an executable that is authorized to access the decrypted version of the encrypted data.

25. The method of claim 19 further comprising receiving from the data encryption process a request to verify that executable code of the application is registered.

26. The method of claim 19 further comprising prior to sending the object encryption key:
retrieving an encrypted version object encryption key;
decrypting the encrypted version of the object encryption key with an encryption key of the policy server;
re-encrypting the object encryption key with an encryption key of the data encryption process.

27. The method of claim 19 further comprising after receiving the key request:
when the policy indicates that approvals from multiple organizations are needed before the request can be granted,
sending an indication of the key request to a policy server of each organization;
receiving from at least some of the organization an approval that includes a part of the object encryption key; and
generating the object encryption key from at least some of the parts.

28. The method of claim 27 wherein the policy server of each organization applies a policy to determine whether to approve the key request.

29. The method of claim 27 wherein a part from each organization is needed to generate the object encryption key.

30. The method of claim 27 further comprising notifying the each policy server of an organization that the request was approved.

31. A method performed by one or more computing devices for providing an application with access to a decrypted version of an encrypted file, the method comprising:
launching a data encryption process for execution on the one or more computing devices;
under control of the data encryption process,
initiating by the data encryption process launching of an executable of the application for execution on the computing device as an application process in a secure execution environment, the secure execution environment restricting the application process to resources within the secure execution environment;
upon receiving from the application process a request to read from the encrypted file,
sending to a policy server a key request for an object encryption key for the encrypted file;
receiving from the policy server an object encryption key for the encrypted file wherein the policy server sends the object encryption key in response to receiving the key request;
retrieving at least a portion of the encrypted file;
decrypting the retrieved portion using the object encryption key; and
storing the decrypted portion in the secure execution environment so that the decrypted portion is accessible by the application process, and the application process cannot output the decrypted portion to any resources outside the secure execution environment
wherein the application process is not provided with the object encryption key.

32. The method of claim 31 further comprising, under control of the data encryption process, verifying that the executable is registered with the policy server prior to launching the executable.

33. The method of claim 31 further comprising, under control of the data encryption process, dynamically modifying the secure execution environment during execution of the application process.

34. The method of claim 33 wherein the secure execution environment is modified based on a request to access certain data.

35. The method of claim 31 wherein the key request includes a hash of the executable.

36. The method of claim 31 further comprising, under control of the data encryption process, changing an apparent root directory for the application process.

* * * * *